Aug. 22, 1933.  A. G. McCOY ET AL  1,923,448
WHIPSTOCK
Filed Oct. 17, 1930  3 Sheets-Sheet 1
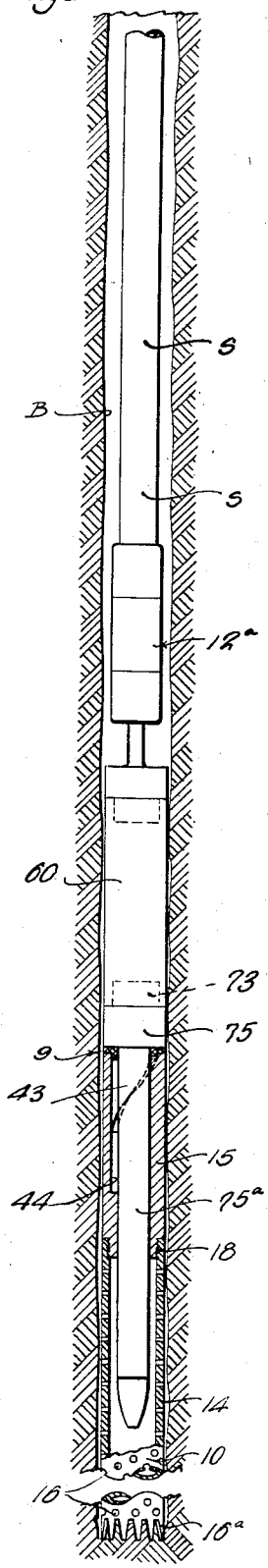
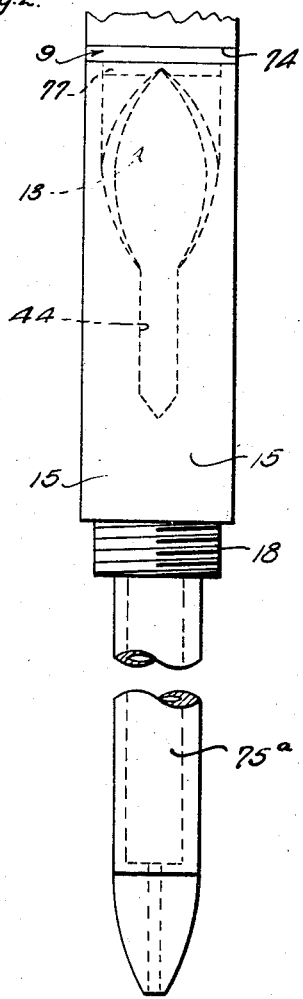
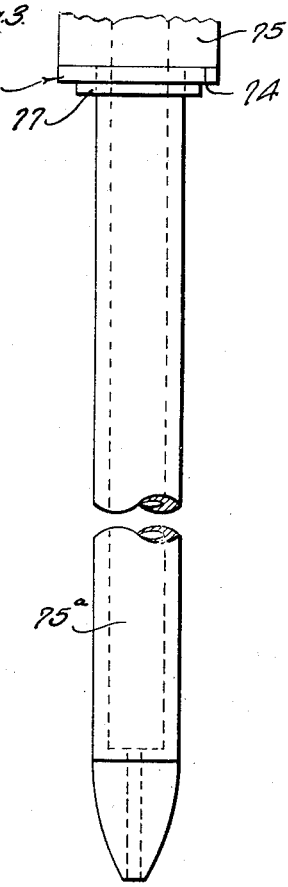
INVENTORS
ARCHIE G. McCOY
AND
BENJAMIN W. SUNDE
BY
THEIR ATTORNEY Aug. 22, 1933. A. G. McCOY ET AL 1,923,448
WHIPSTOCK
Filed Oct. 17, 1930 3 Sheets-Sheet 2
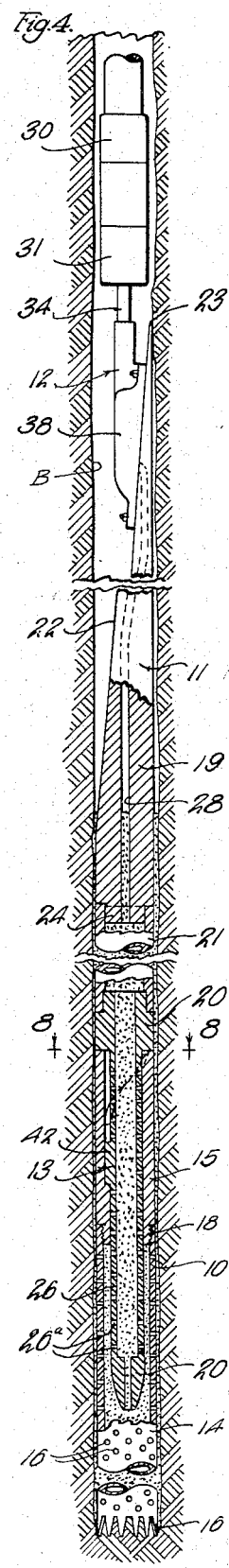
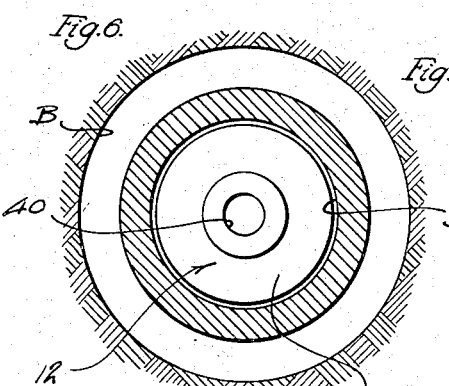
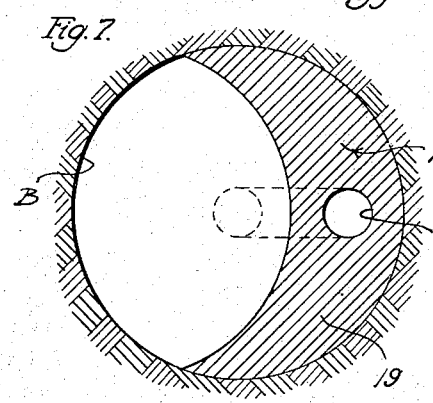
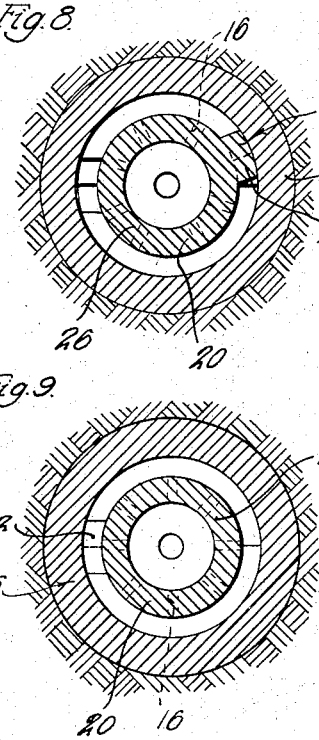
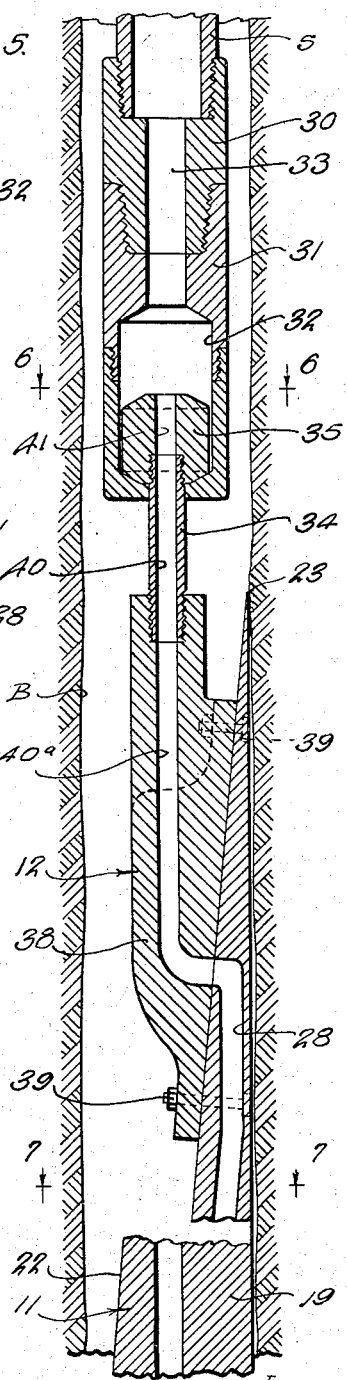
INVENTORS
ARCHIE G. McCOY
AND
BENJAMIN W. SUNDE
BY
THEIR ATTORNEY

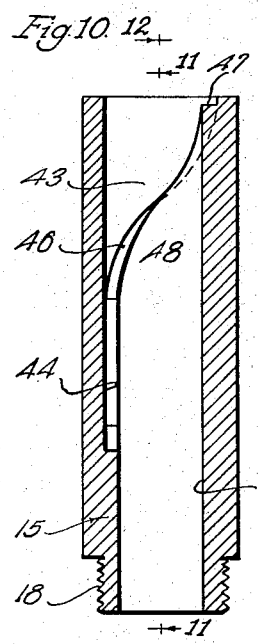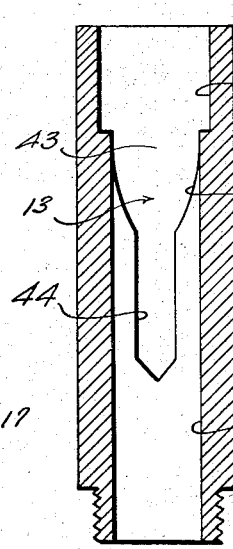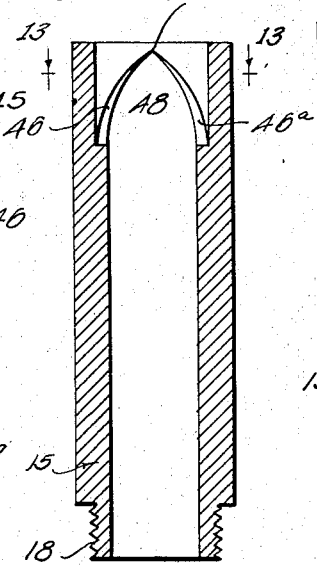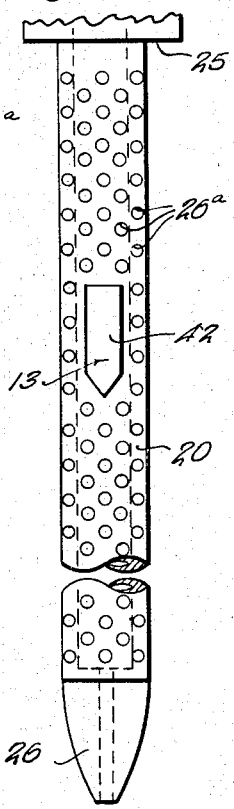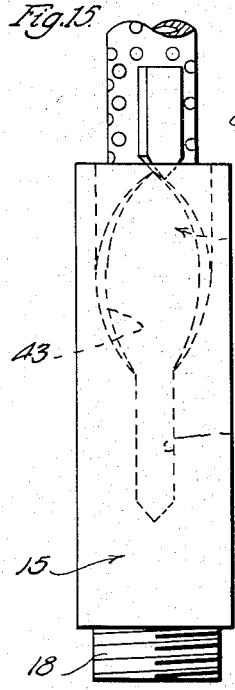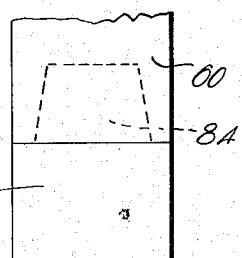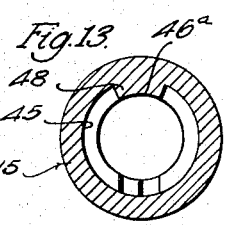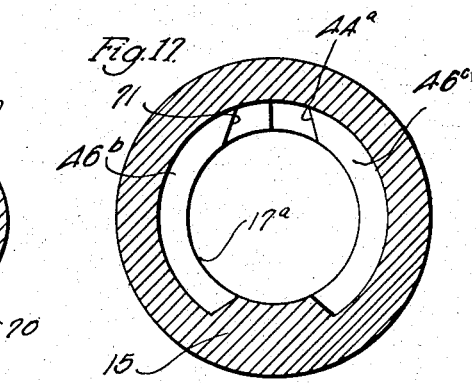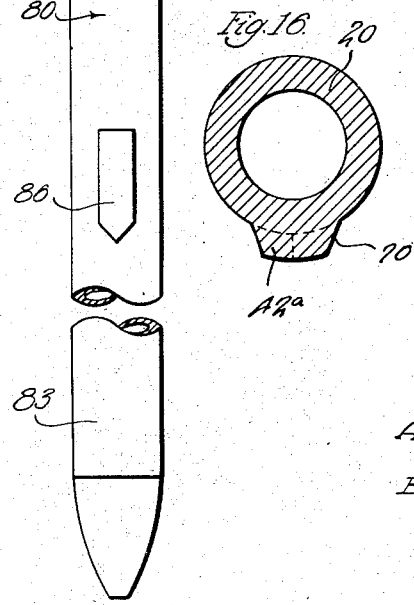

Patented Aug. 22, 1933

1,923,448

UNITED STATES PATENT OFFICE 1,923,448

WHIPSTOCK

Archie G. McCoy and Benjamin W. Sunde, Long Beach, Calif., assignors, by mesne assignments, to Blackwell and Sunde Inc., Long Beach, Calif., a Corporation of California Application October 17, 1930. Serial No. 489,350

15 Claims. (Cl. 255—1)

This invention relates to a device for use in a well, and relates more particularly to a whipstock.

During the course of drilling a well, it is sometimes desirable to change the course of the drilling tools, for example, it may be desirable to divert a drilling tool from a well bore in which tools have been stuck or lost, or it may be desirable to deflect or divert a drilling tool from a well bore that is excessively crooked. Devices, commonly termed whipstocks, are often employed to deflect well drilling tools. The usual whipstock is provided with an inclined face that deflects the drilling tool from its normal course to cause it to pass from one side of the well bore. It has been found difficult to orient or locate a whipstock in a well bore so that its inclined face diverts the drilling tool in the direction desired.

It is an object of this invention to provide a means for seating or mounting a whipstock in a well bore so that its inclined face will divert the tools in the desired direction.

It is another object of the invention to provide a construction or apparatus that is particularly well suited for carrying out the method set forth in our co-pending application entitled Method of diverting a well drilling tool, filed October 17, 1930, Serial Number 489349.

It is another object of the invention to provide a shoe or socket that may be set in a well bore, and a whipstock that may be lowered into the well bore and seated on the socket in a rotative position where its tool-diverting part is in the proper position.

It is another object of the invention to provide an improved means for determining the rotative position of the socket after it has been seated in the well bore, so that a whipstock may be formed to seat on the socket to have its tool-diverting part in the desired position.

It is another object of the invention to provide means for passing cement, or the like, to the socket and whipstock after the whipstock has been seated on the socket to effectively secure them in the well bore.

It is another object of the invention to provide a combination of elements for side-tracking or diverting a drilling tool from a well bore in a given direction that includes a socket to be dropped or lowered into the well bore, an impressionable member carried by or incorporated with a suitable well surveying device adapted to be lowered into the well bore to cooperate with the socket and receive an impression from the socket whereby the rotative position of the socket may be determined, and a whipstock that may be made in accordance with the impression made on the impressionable member, so that it will seat on the socket in the desired rotative position.

It is another object of the invention to provide an improved means for connecting the whipstock to a string of pipe, or the like, for lowering it into a well bore, whereby it may remain connected to the socket when the string of pipe is withdrawn from the well.

It is another object of the invention to provide an improved shoe or socket and a whipstock of the character mentioned that are constructed so that the whipstock may be dependably and accurately set in the correct or desired position on the socket.

It is another object of the invention to provide a connection between the whipstock and the socket whereby the whipstock is securely seated on the socket so that it cannot be turned or shifted when in operation.

It is a further object of the invention to provide a means for mounting the whipstock on the socket whereby the whipstock may be easily and quickly arranged in the desired position on the socket.

Other objects and features of the invention will be readily apparent from the following detailed description of typical forms and applications of the invention, throughout which description reference will be had to the accompanying drawings, in which:—

Fig. 1 is a sectional view of the lower portion of a well bore, illustrating the socket in the bore and the impression plate engaging the socket. Fig. 2 is an enlarged elevation of the upper portion of the socket, showing the impression plate seated on the socket. Fig. 3 is an enlarged side elevation of the member carrying the impression plate. Fig. 4 is a view of the lower portion of the well bore, showing the socket in position in the well bore and showing the whipstock connected with a string of pipe and seated on the socket, the socket and certain parts of the whipstock being shown in longitudinal cross section. Fig. 5 is an enlarged longitudinal detailed sectional view of the upper part of the whipstock and the connection between the whipstock and a string of pipe. Fig. 6 is an enlarged transverse detailed sectional view taken as indicated by line 6—6 on Fig. 5. Fig. 7 is an enlarged transverse detailed sectional view taken as indicated by line 7—7 on Fig. 5. Fig. 8 is an enlarged transverse detailed sectional view taken substantially as indicated by line 8—8 on Fig. 4, showing the key sliding on one of the spiralled faces in the socket. Fig. 9 is a view similar to Fig. 8, showing the key seated in the keyway. Fig. 10 is an enlarged longitudinal detailed sectional view of the upper section of the socket. Fig. 11 is a view taken as indicated by line 11—11 on Fig. 10, illustrating the keyway in elevation. Fig. 12 is a longitudinal sectional view taken as indicated by line 12—12 on Fig. 10. Fig. 13 is a transverse sectional view taken as indicated by line 13—13 on Fig. 12. Fig. 14 is an enlarged side elevation of the guide stem or bull plug on the whipstock. Fig. 15 is an enlarged side elevation of the upper section of the socket, illustrating the key starting into the socket. Fig. 16 is an enlarged transverse detailed sectional view of the guide stem or bull plug, showing a key on the plug having tapered or divergent side walls. Fig. 17 is an enlarged transverse detailed sectional view of the socket, illustrating the keyway for receiving the type of key illustrated in Fig. 16, and Fig. 18 is a side elevation of a guide plug carried by a surveying instrument having a key for fitting a keyway in the socket.

The construction or device provided by the present invention includes, generally, a shoe or socket 10 adapted to be set in a well bore B, an impression member 9, or the equivalent, adapted to be lowered into the well bore to determine the rotative position of the socket, a whipstock 11 adapted to be lowered into the well bore B on a string S of drill pipe, or the like, a releasable or frangible connection 12 between the string S and the whipstock 11, and means 13 for seating or mounting the whipstock 11 on the socket 10 in a given or desired rotative position.

The shoe or socket 10 is intended to be set in a well bore B at or immediately below the point where it is desired to arrange the whipstock 11. The socket 10 is provided to support or mount the whipstock in the well and is of tubular construction. In the particular case illustrated, the socket 10 is sectional, including a lower section 14 and an upper section 15. The lower section 14 may be a plain tubular member, having a toothed or serrated lower end. The section 14 may be perforated, having a plurality of spaced openings 16 in its walls.

The upper section 15 of the socket 10 is provided to directly support the whipstock 11 and is tubular, having a central longitudinal opening 17. The section 15 may have a threaded connection 18 with the lower section 14. The upper end of the section 15 is preferably flat and normal to the longitudinal axis of the socket.

The socket 10 is intended to be lowered into or dropped in the well bore B. In practice, the socket 10 may be dropped in the well, and the toothed lower end of the socket is adapted to bite into the formation at the bottom of the well bore to initially lock the socket 10 against movement. The teeth 16ᵃ at the lower end of the socket 10 may be curved or bent inwardly so that they will not bite into the side walls of the well bore when the socket is dropped in the well.

The whipstock 11 is adapted to be lowered into the well B on the string S, or the like, and is intended to seat on the socket 10. The whipstock 11 may be sectional and may include an upper or main section 19, a lower section 20, and one or more spacer or intermediate sections 21 between the upper and lower sections. The upper or main section 19 of the whipstock is an elongated member of round cross sectional configuration. The section 19 is preferably integral and is provided on its upper end with an inclined face 22. The angular or inclined face 22 is provided to divert drilling tools from the well bore B, and the extent or the degree of inclination of the face 22 depends upon various factors. The face 22 preferably extends from one side of the section to the other, and extends completely across the upper end of the section 19, so that the section 19 presents a tapered point 23 at its upper end. The face 22 may be concaved or transversely curved throughout its length, to slidably guide the drilling tools. The direction of inclination of the face 22 depends upon the relative positions of the parts of the means 13 and may be made to conform to any particular situation that may be encountered, as will be more fully described when the operation of the device is set forth below.

The spacer or intermediate sections 21 may be in the nature of lengths of pipe or tubing, and are provided to space the upper section 19 from the lower section 20 and socket 10, so that there will be little or no danger of the drilling tools striking the shoe 10 after they have been deflected from the well bore by the face 22. The uppermost section 21 may have a threaded or welded connection with a pin 24 on the section 19. The lower section 20 may have a welded connection with the lowermost section 21. In the preferred form of the invention the connection between the lowermost section 21 and the section 20 is such that the section 21 and the section 20 incline so that the point 23 of the whipstock seats against the wall of the bore B. The section 20 is provided with a downwardly-facing annular shoulder 25 adapted to fit on the upper end of the socket 10 when the whipstock is in position on the socket.

A guide stem or bull plug 26 projects downwardly from the shoulder 25. The plug 26 is round in cross section and is adapted to slidably fit the opening 17 in the section 15. The bull plug 26 is provided to guide the whipstock through the well bore and to center the whipstock on the socket 10. In the preferred form of the invention, the plug 26 is comparatively long, so that it extends into the section 14 when the whipstock is in the final position on the socket 10, and may have a rounded or converging lower end. It is to be noted that the plug 26 has long bearing engagement with the walls of the opening 17, so that it aids in supporting the whipstock 11 against lateral thrusts.

The socket 10 and the whipstock 11 are adapted to be permanently cemented in the well bore B. In the preferred form of the invention, a fluid passage 28 is provided in the whipstock 11. The fluid passage 28 extends longitudinally through the whipstock from one end to the other. The upper end of the fluid passage 28 may be in the face 22, while the lower end of the passage discharges from the plug 26. The plug 26 may be perforated or provided with a plurality of openings 26ᵃ. The fluid passage 28 is provided to receive fluid or plastic cement from the string S. When the whipstock is seated on the socket 10, fluid cement may be discharged from the lower end of the fluid passage through the openings 26ᵃ and the lower end of the plug to fill the lower portion of the socket and the well bore adjacent the socket and the lower portion of the whipstock. The openings 16 are provided to pass the cement mixture from the interior of the socket to the well bore at its exterior.

The means 12 is provided to connect the whipstock 11 to the lower end of the string S. The means 12 is such that the whipstock 11 may be disconnected from the string S after it has been seated on the socket 10, so that the operating string S may be withdrawn from the well. In accordance with the broader principles of the invention, the means 12 may be varied considerably without departing from the broader spirit of the invention. In the particular case illustrated the means 12 includes a sub 30 or similar connecting member on the lower end of the string S and a sectional chambered member 31 on the sub 30. The member 31 is provided with a central longitudinal chamber 32, communicating with the fluid passage 33 in the sub 30. The chamber 32 is preferably of round cross section. The means 12 includes a tubular stem 34, the upper end of which extends into the chamber 32. A plunger or head 35 is arranged on the stem to slidably operate in the chamber 32. The head 35 is proportioned so that it may slide longitudinally in the chamber and may freely rotate in the chamber.

The lower end of the stem 34 is connected with the whipstock 11. A flanged fitting 38 may be provided on the lower end of the stem 34 to fit against the face 22. The fitting 38 may be connected with the section 19 by comparatively small bolts 39. The bolts 39 are in the nature of shear bolts and are such that they may be readily broken or sheared upon a downward pressure being exerted upon the string S after the whipstock has been seated on the socket 10. It will be readily apparent how the bolts 39 may be sheared off flush with the face 22 upon a downward force being exerted upon the string S while the whipstock 11 is held stationary. The fluid passage 40 in the stem 34 communicates with an opening 40a in the fitting 38 which discharges into the upper end of the fluid passage 28, and a central opening 41 is provided in the head 36 to pass the cementing mixture from the chamber 32 into the passage 40.

The means 13 for mounting or seating the whipstock 11 in the desired or given rotative position on the socket 10 includes a key on one of these parts to cooperate with a keyway in the other. In the preferred embodiment of the invention the key 42 is provided on the whipstock 11 to cooperate with or fit in a keyway 43 in the socket 10. The key 42 is provided on the bull plug 26. In the form of the invention illustrated in Figs. 5 to 12, inclusive, of the drawings, the sides of the key 42 are flat and parallel. In accordance with invention the lower end of the key 42 is convergent or pointed, as clearly illustrated in Fig. 11 of the drawings.

The keyway 43 is provided in the opening 17 in the upper section of the socket 10. The keyway 43 includes a lower axially extending portion 44, or keyway proper, to receive and hold the key 42. The axial portion 44 of the keyway is elongated, having straight parallel side walls, and is proportioned to slidably receive the key 42. The lower end of the straight or axial portion 44 of the keyway is pointed to receive the pointed lower end of the key. In accordance with the invention, the longitudinal or axial portion 44 of the keyway is provided in the lower end of an enlargement 45 in the opening 17. The enlargement 45 of the opening 17 extends downwardly from the upper end of the section 15 to the top of the axial portion 44 of the keyway. One side wall or edge 46 of the enlargement 45 joins the upper end of one side wall of the axial portion 44 of the keyway, while the other side wall or edge 46a of the enlargement 45 joins the upper end of the other longitudinal side of the part 44. The sidewalls 46 and 46a of the enlargement 45 extend upwardly from the straight portion 44 of the keyway and are spiralled in opposite directions. The faces or walls 46 and 46a join at a point adjacent the upper end of the section 15, forming a beveled edge 47. In the preferred form of the invention, the point or beveled edge 47 is spaced a short distance below the upper end of the section 15. The spiral or curvatures of the helicoidal faces 46 and 46a are such that their upper ends join at the point 47 which is above and 180° around the opening 17 from the longitudinal center of the portion 44.

The portion 48 of the section 15, lying between the spiralled edges or faces 46 and 46a, is in the nature of a protuberance in the opening 17, having a beveled edge 47 at its upper end. The faces 46 and 46a are provided to slidably guide the key 42 into the axial portion 44 of the keyway. It is to be noted that the key 42 will be guided into the axial portion 44 of the keyway upon engaging either of the spiralled faces 46 or 46a. Upon the whipstock being lowered into the well bore, the bull plug 26 enters the opening 17 and the key 42 is guided into the axial or straight part of the keyway by either of the spiralled faces 46 or 46a.

In Figs. 16 and 17 of the drawings we have illustrated an embodiment of the invention in which the longitudinal edges 70 of the key 42a are inwardly divergent. In this embodiment of the invention, the spiralled faces 46b and 46c, leading to the straight portion 44a of the keyway, are beveled inwardly toward the center of the opening 17 to effectively receive the sides 70. Further, the side walls 71 of the keyway proper of the straight portion 44a are inwardly divergent to receive and cooperate with the edges 70.

When constructing the whipstock 11, it is desirable to position the key 42 relative to the inclined face 22 so that the face 22 will be in the desired position when the whipstock is finally seated on the socket 10. In order to relate the key to the inclined face so that the inclined face will be in any given position when the whipstock is seated on the socket, it is necessary to know the rotative position of the socket 10. The rotative position of the socket may be determined in any suitable manner. It has been found practical to employ the impression plate 9 or a keyed guide member 80 of the character shown in Fig. 18 for this purpose, however, it is to be understood that the invention is not to be considered as restricted to the use of the members 9 or 80.

The impression member or plate 9 is adapted to be employed in connection with a suitable well surveying instrument for indicating or recording the rotative or compass position of the member when it is in the well bore. In Fig. 1 of the drawings we have illustrated in a general manner a typical well surveying device 60, carried on the lower end of a string of pipe S. The invention is not concerned with the form of surveying instrument used, and any of the well surveying devices in common use may be employed. The surveying device 60 preferably has a rotatable connection 12a with the string of pipe S. The device 60 is provided to record the compass or rotative position when the impression plate 9 is seated on the socket 10.

The impression member or plate 9 is carried on a part or section 75 similar to the section 20 of the whipstock 11. The section 75 may have a screw-threaded pin 73 threaded into the lower end of the surveying device 60. A downwardly-facing annular shoulder 74 is provided on the section 75. A guide stem or bull plug 75ª projects downwardly from the shoulder 74. The plug 75ª is adapted to slidably fit into the opening 17 in the socket 10 when the string S' is lowered into the well bore. The plug 75ª is provided to guide the plate 9 into position on the socket and to center it on the socket. The impression member or plate 9 is seated against the shoulder 74. The plate 9 is annular and surrounds the bull plug 75ª. The plate 9 is formed of lead or other material that is readily marked or impressed. A downwardly-projecting annular flange 77 is provided on the plate 9 to extend into the upper portion of the enlargement 45 when the section 75 seats on the socket 10. When the string S' is lowered into the well bore, the plug 75ª slidably fits into the opening 17 and the impression plate 9 seats on the upper end of the section 15 and the flange 77 extends into the enlargement 45 so that the beveled edge 47 makes a mark or impression in it. The surveying device 60 may then be operated to record rotative or compass position. The location of the beveled edge 47 relative to the axial portion 44 of the keyway is known, so that the exact position of the axial portion 44 may be readily computed from the record made by the surveying instrument 60 and the mark made on the flange 77 by the beveled edge 47.

The keyed member 80 is adapted to be mounted on the lower end of the well surveying instrument 60 in place of the member 75. It is to be understood that the member 80, the impression member 9, or any other suitable means, may be employed in connection with a well surveying instrument to determine the rotative position of the socket 10 after it has been positioned in the well bore. The member 80 is adapted to be used in connection with the well surveying device 60 for indicating and recording the rotative position and/or the inclination of the socket. The member 80 is similar, generally, to the section 20 of the whipstock, that is, it includes an upper portion 81 presenting a downwardly-facing shoulder 82 and a guide stem or bull plug 83. A screw-threaded pin 84 may be provided on the upper end of the portion 81 to thread into a socket in the lower end of the instrument 60. The bull plug 83 is adapted to slidably fit into the opening 17 of the socket and its lower end may be rounded as illustrated in the drawings. A key 86 projects from the bull plug 83. The key 86 may be similar to the key 42 described above and is adapted to fit into the straight portion 43 of the keyway in the socket. The key 86 may have a pointed lower end to fit the lower end part of the keyway. When the well surveying device is lowered into the well bore on the string S' the plug 83 fits into the opening 17 and the key 83 is guided into the keyway 43 either by the face 46 or the face 46ª. The shoulder 82 is adapted to rest on the upper end of the socket 10. When the member 80 has been seated on the socket, the instrument 60 may operate or may be actuated to record its rotative position at that time. It will be readily apparent how the rotative position of the socket 10 may be computed from the reading of the instrument 60 and by considering that the key 86 was in the keyway when the record was made by the instrument.

In employing the apparatus provided by the present invention, the socket 10 may be arranged in the well bore B in any suitable manner. In practice the socket 10 may be dropped through the well bore so that the teeth 16ª bite into the formation at the bottom of the bore. The rotative position of the socket 10 may be determined in any suitable manner. When employing the impression member 9 and a suitable well surveying device to determine the position of the socket, the well surveying device 60 carrying the section 75 and its impression member 9 is lowered into the well bore on a string S'. Upon the section 75 seating on the socket 10, the flange 77 strikes the beveled edge 47 and the beveled edge makes a cut or impression in the flange. The well surveying device 60 may then be operated to record the rotative position of the impression plate. The string S' may then be withdrawn from the well bore and the instrument 60 may be read, together with the impression in the flange 77, to determine the exact rotative position of the socket 10. To determine the rotative position of the socket by means of the keyed member 80 a similar procedure is followed. The member 80 is mounted on the lower end of the surveying instrument 60 and is lowered into the well bore. The bull plug 83 passes into the opening 17 and the key 86 is guided into the keyway portion 44 by the spiralled face 46 or the spiralled face 46ª. When the key 86 has come to rest in the keyway 44 the surveying device 60 may operate or be actuated to record its rotative position. When the string S' has been withdrawn from the well bore the rotative position of the socket 10 may be readily determined by comparing the position of the key 86 and the record made by the instrument 60.

After the rotative position of the socket 10 has been determined or ascertained, a whipstock 11 may be constructed to have the key 42 related to the inclined face 22, so that the inclined face will be in the desired position when the whipstock is seated on the socket. The whipstock 11 may then be lowered into the well bore B on the lower end of the operating string S. The bull plug 26 is adapted to extend into the socket 10 so that the key 42 is guided into the portion 44 of the keyway by the face 46 or the face 46ª. The connection 12 permits free rotation of the whipstock relative to the string S when the key is guided into the axial portion 44 of the keyway. When the whipstock 11 has been seated on the socket 10, cement in a fluid or plastic state may be passed downwardly through the string S to flow through the stem 43 and fluid passage 28, so that it is discharged into the bottom of the well bore. The cement may fill the interior of the section 14 of the socket and may pass through the openings 16 to the exterior of the socket. Sufficient cement may be poured into the string S to flow up around the socket 10 and the lower portion of the whipstock 11. Upon the cement setting or hardening, a downward pressure may be exerted on the string S to shear off the bolts 30 so that the string S may be withdrawn from the well bore. The whipstock 11 is then permanently set in position for sidetracking or diverting well drilling tools in the direction desired.

It is to be noted that the present invention provides a construction whereby a whipstock may be set in a well bore with its inclined tool-diverting face in any given position. The exact rotative position of the socket 10 may be readily determined by means of the impression member 9, the keyed member 80, or the equivalent, employed in conjunction with a suitable well surveying instrument, so that a whipstock may be constructed having a key and an inclined face that are related to one another so that the inclined face 22 will be seated on the socket 10. The invention provides seated on the socket 10. The invention provides simple and practical means for delivering a cementing mixture to the socket 10 and the whipstock 11. The keyway 43 is constructed so that the key 42 is guided to its correct position in the axial portion 44. The shoulder 25 acts to transmit the downward thrusts to the socket 10 during operation of the whipstock.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. In combination, two elements, one a socket adapted to be arranged in a well bore, the other a whipstock, and means for seating the whipstock in a definite rotative position on the socket including a single key on one element to cooperate with a keyway in the other.

2. In combination, two elements, one a socket adapted to be arranged in a well bore, the other a whipstock having an inclined tool-diverting face, and means for seating the whipstock in a definite rotative position on the socket including a single key on one element to cooperate with a keyway in the other.

3. In a construction of the character described, two elements, one a socket adapted to be set in a well bore, the other a whipstock adapted to be lowered into the well bore and seated on the socket, and means for mounting the whipstock in a definite rotative position on the socket including a single key on one element, and a keyway in the other element to receive the key.

4. In a construction of the character described, two elements, one a socket adapted to be set in a well bore, the other a whipstock adapted to be lowered into the well bore and seated on the socket, and means for mounting the whipstock in a predetermined rotative position on the socket including a key on one element, a keyway in the other element to receive the key, and a spiralled face to guide the key into the keyway.

5. In a construction of the character described, two elements, one a socket adapted to be set in a well bore, the other a whipstock adapted to be lowered into the well bore and seated on the socket, and means for mounting the whipstock in a predetermined rotative position on the socket including a single key on one element, a keyway in the other element, and helicoidal faces on the said other element for guiding the key into the keyway.

6. In a construction of the character described, two elements, one a socket adapted to be set in a well bore, the other a whipstock adapted to be lowered into the well bore and seated on the socket, and means for mounting the whipstock in a predetermined rotative position on the socket including a key on one element, a keyway in the other element, and two helicoidal faces on the said other element joining the opposite sides of the keyway and spiralled in opposite directions from the sides of the keyway for guiding the key into the keyway.

7. In a construction of the character described, two elements, one a socket adapted to be set in a well bore, the other a whipstock adapted to be lowered into the well bore to seat on the socket, and means for mounting the whipstock in a definite rotative position on the socket including a key on one element, a single keyway in the other element, and two helicoidal faces for guiding the key into the keyway, one of the faces having an end joining one side of the keyway, the other face having an end joining the other side of the side of the key, the faces being spiralled in opposite directions from the keyway to join at a beveled edge.

8. In a well tool of the character described, a socket adapted to be set in a well, a whipstock adapted to be seated on the socket, and means for mounting the whipstock in a definite rotative position on the socket including a key on the whipstock, a keyway in the socket to receive the key, and means for guiding the key into the keyway.

9. In a well tool of the character described, a socket adapted to be set in a well, a whipstock adapted to be seated on the socket, and means for mouning the whipstock in a definite rotative position on the socket including a key on the whipstock, a longitudinal keyway in the socket for receiving the key, and helicoidal faces joining the upper end of the keyway and spiralled upwardly from the keyway in opposite directions.

10. In combination, a socket adapted to be set in a well, a whipstock adapted to be lowered into a well on an operating string, a frangible connection between the whipstock and the string, and means for orienting the whipstock on the socket, including a key on the whipstock, a keyway in the socket to receive the key, and a helicoidal face for guiding the key into the keyway.

11. In combination, a socket adapted to be set in a well, a whipstock adapted to be lowered into a well on an operating string, a rotatable and frangible connection between the whipstock and the string, and means for orienting the whipstock on the socket, including a key on the whipstock, a keyway in the socket to receive the key, and a helicoidal face for guiding the key into the keyway.

12. In combination, a socket adapted to be dropped in a well bore, a whipstock adapted to be carried by an operating string, a frangible connection between the whipstock and the string, a key on the whipstock, and a keyway in the socket for slidably receiving the key, there being a fluid passage through the said connection and the whipstock discharging in the socket.

13. A device of the character described, including a tubular socket adapted to be arranged in a well bore, a whipstock adapted to be seated on the socket and including a guide stem to extend into the socket, and a key projecting from the guide stem, and a keyway in the socket for receiving the key having a longitudinal portion and helical faces for guiding the key into the longitudinal portion.

14. A device of the character described, including a socket adapted to be arranged in a well bore, a whipstock adapted to be lowered into the well on a string of pipe, a keyway in the socket, a key on the whipstock, means for guiding the key into the keyway, and a frangible connection between the string of pipe and the whipstock including a tubular stem communicating with the pipe, and shear bolts connecting the stem with the whipstock, there being a fluid passage in the whipstock communicating with the stem and discharging into the socket.

15. In combination, two elements, one a socket adapted to be arranged in a well bore, the other an elongate whipstock having a longitudinal bore extending therethrough and being adapted to seat on the socket, and means for seating the whipstock in a definite rotative position on the socket including a key on one element, and a keyway in the other element to receive the key.

ARCHIE G. McCOY.
BENJAMIN W. SUNDE.